Figure 1:
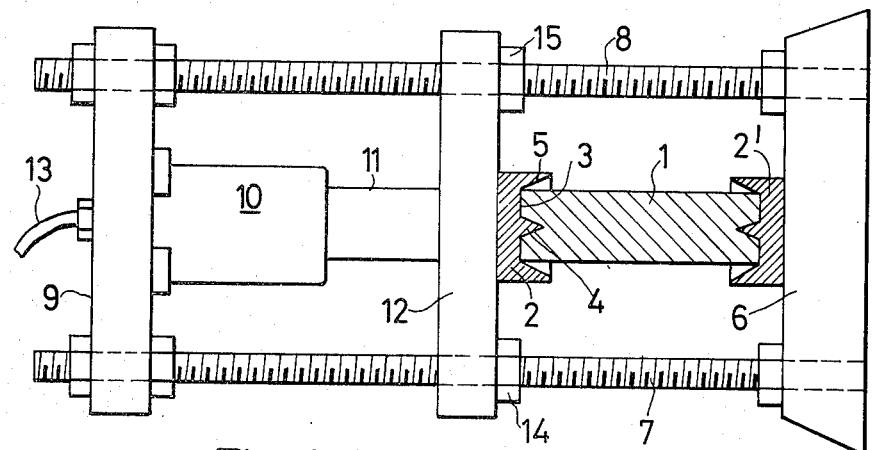

United States Patent [19]

Kubálek

[11] 3,910,097
[45] Oct. 7, 1975

[54] PRESSING TOOL FOR PREPARING WORK PIECES

[76] Inventor: Miroslav Kubálek, Deublergasse 42/2, Vienna 21, Austria

[22] Filed: Mar. 11, 1974

[21] Appl. No.: 449,978

[30] Foreign Application Priority Data
Mar. 15, 1973  Austria .................. 2304/73

[52] U.S. Cl. .................. 72/354; 72/358; 72/359
[51] Int. Cl.² .................. B21D 28/32
[58] Field of Search .................. 72/354, 358, 359

[56] References Cited
UNITED STATES PATENTS

| | | | |
|---|---|---|---|
| 1,640,964 | 8/1927 | Schlaupitz et al. | 72/354 |
| 1,910,384 | 5/1933 | Eksergian et al. | 72/354 |
| 2,138,867 | 12/1938 | Lanto | 72/354 |

FOREIGN PATENTS OR APPLICATIONS 585,077  1/1947  United Kingdom .................. 72/354

*Primary Examiner*—Milton S. Mehr
*Attorney, Agent, or Firm*—John J. Dennemeyer

[57] ABSTRACT

A pressing tool for preparing work pieces provides a tool which is adapted to a preferably plane end surface and a countersunk bore of the work pieces for receiving the turning pin of a lathe. The tool comprises a press ram operated by hydraulic pressure a specific distance determined by the desired length of the work piece. As the tool advances a set distance against the work piece it effects a plastic deformation of the work piece end until it abuts stop means defining the set operating distance and it is thereafter returned to its starting position.

3 Claims, 6 Drawing Figures

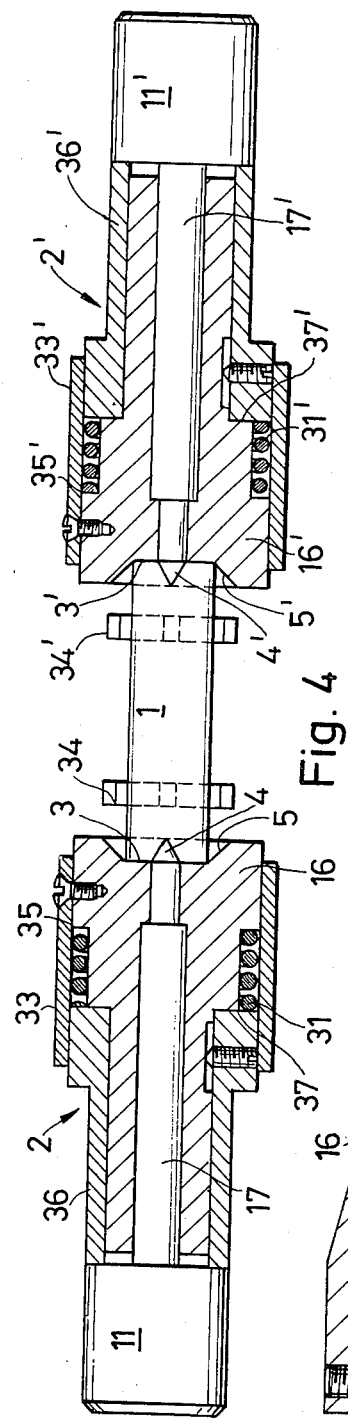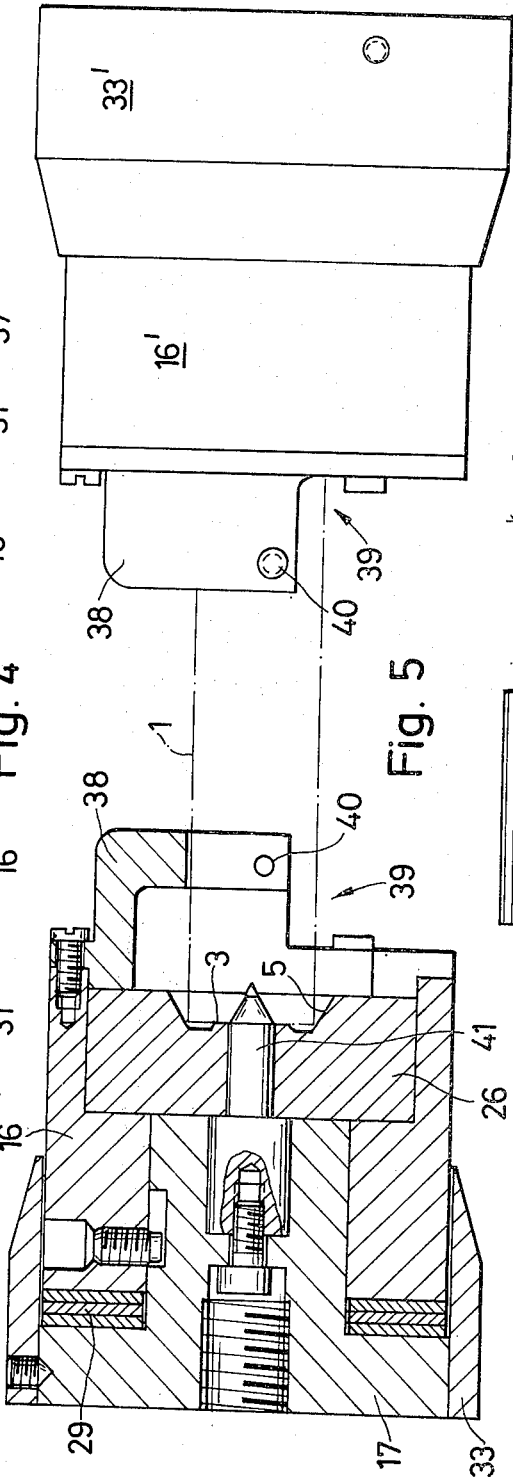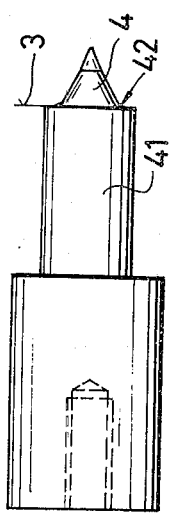
Fig. 4
Fig. 5
Fig. 6

PRESSING TOOL FOR PREPARING WORK PIECES

The present invention relates to a pressing tool for preparing work pieces of a tough material wherein the work piece is provided at least on one end with a preferably plane surface and a recessed bore which is concentric with the end surface for receiving a turning center.

The procedure followed hitherto consists in clamping the work piece to be turned into the chuck of a lathe, and to rotate the work piece with the chuck, wherein a turning tool is guided perpendicularly to the axis over the end face of the work piece until the desired face surface is obtained. Thereafter a countersink drill bit is advanced in the turning axis toward the end face of the work piece still in rotation until the desired countersunk bore has been produced. After one end of the work piece has been so prepared the work piece is reversed and the entire procedure is repeated with regard to the other work piece end face. This procedure is cumbersome and time consuming. In order to perform it, a complete lathe with a jaw clamping chuck is required.

It is an object of this invention to simplify the preparation process, to accelerate it and to make it less expensive with respect to the requirement of auxiliary means. The invention consists essentially in that a tool which is fully adapted to the countersunk bore and preferably also to the face bore is produced and is pressed in the axial direction of the work piece toward its front face end over a distance which is sufficient to appropriately prepare it by plastic deformation. Once the tool has been set, large series of work pieces may be finished rapidly and cheaply in a single pressing operation.

In case both work piece ends are to be prepared for turning between turning centers, the invention provides that two tools which are adapted to the countersunk bore or the front face and the countersunk bore are produced and pressed in a known manner simultaneously in the axial direction of the work piece against its end faces. The preparation of the work piece takes place also in this case by a single pressing operation which requires no reversing of the work piece.

A preferred procedure according to the invention, which avoids a tendency for brittleness and cracks in the cold flowing material, consists in that the tool is prepared so as to present an outer part adapted to the front face and an inner part which is axially movable relative to the outer part and adapted to the countersunk bore, whereupon initially the front face is pressed by means of the outer part and maintained under pressure until the countersunk bore has also been produced by the inner part.

Although the process of the invention could also be carried out in principle with very primitive means, e.g., with hammer, flat and pointed centers, a machine operation is primarily considered for reasons of precision. The device necessary for this operation has, in a known manner, a support for one front face of the work piece, a hand press operating in the axial direction of the supported work piece and a tool adapted to be pressed by the hand press against the other end of the work piece, wherein according to the invention the tool has an essentially conical countersink pin for making the countersunk bore and preferably also a pressing face that is essentially normal to the axis for preparing the front face of the work piece.

For practical pruposes this operation has no relation with a lathe used hitherto for the same purpose and which, if available, is no longer needed and can be used for other manufacturing purposes because of this invention. The hand press can be a mechanical eccentric press or a hydraulic cylinder press.

An embodiment of the invention which is preferred for mass production comprises a work piece holder which engages the work piece to be turned at its periphery. The work piece holder consists preferably of a feeding device which operates in a cycle and provides an automatic introduction and discharge of the work pieces.

During the preparation of the work pieces at both ends the support carries also a tool provided with an essentially conical countersink pin and a pressing surface which is essentially normal to the axis. For mass production it is also appropriate that the support consists also of a press ram which carries the tool and operating in the axial direction against the work piece end, wherein both press rams may be pressed simultaneously and in opposite directions against the face ends of the work piece. Due to the simultaneous and symmetrical application of pressure the work piece remains practically at rest without any special clamping measure and is not displaced for example when it is taken up on a conveyor belt.

To eliminate essentially the need for measuring procedures during mass production, each press ram may be appropriately adjusted in the direction of the work piece axis to the desired work piece length. This adjusting action may be provided for example by means of threaded shafts disposed parallel to the work piece and stop nuts threadably engaged on these shafts for limiting the pressure stroke of the press ram.

To carry out the preferred method when the pressing operation is idle the apparatus according to the invention is characterized in that the work piece consists of an outer part presenting the pressure surface and an inner part presenting the countersink pin. The inner part is guided axially in the outer part and may be subjected to pressure independently of the outer part. The inner part may be connected directly with the press ram of the hand press, and the outer part can be connected over at least one pressure spring with the press ram of the hand press. For example, a softer pressure spring is provided for the centering process in series with a harder pressure spring for the pressing process and preferably an abutment ring between the two springs for limiting the stroke of the softer spring.

Another possibility consists in that the outer part may be driven by an eccentric wheel of the press which presents a smaller eccentricity and the inner part by an eccentric wheel presenting a greater eccentricity.

Figure 2:
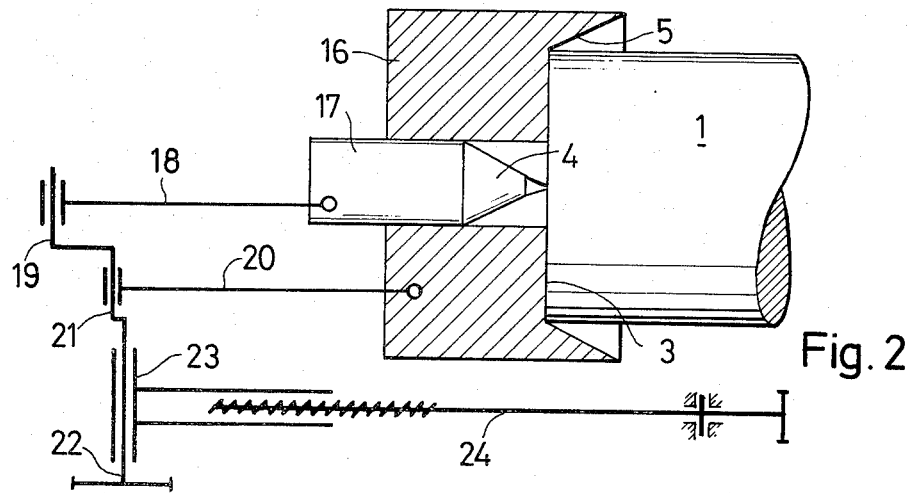
Figure 3:
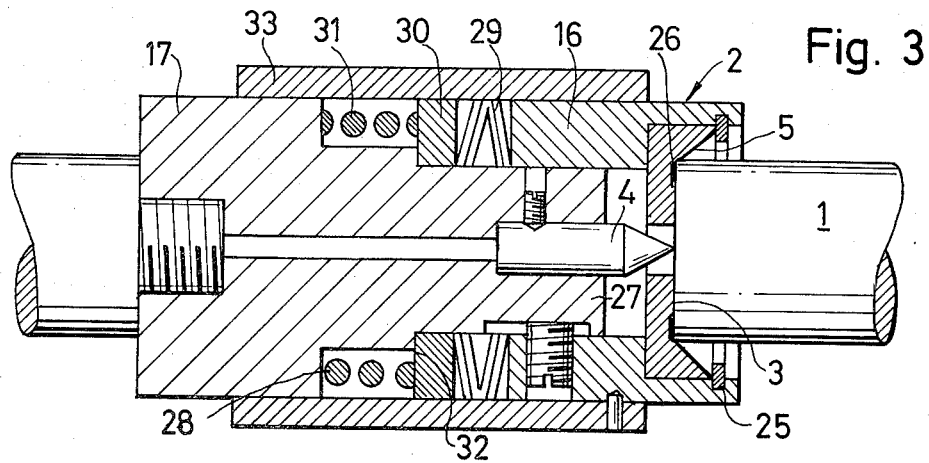

The invention will be described hereafter in greater deatil and with reference to the accompanying drawings presenting several embodiments of the apparatus according to the invention and in which:

FIG. 1 shows a plan view and partly in section a standing apparatus according to the invention, with a hydraulic press, FIG. 2 shows diagrammatically and partly in section an embodiment with a two-ram eccentric press and divided work piece, FIG. 3 shows a divided work piece for a single-ram press in section, FIG. 4 shows an arrangement with two tools and work piece holder for two-sided preparation of work piece ends on a conveyor belt, FIG. 5 shows a modified embodiment of the arrangement of FIG. 4 or 3, and FIG. 6 shows on a larger scale the tool insert presented in the embodiment of FIG. 5.

According to FIG. 1, a work piece 1 to be turned is clamped between the tools 2 and 2' by means of which the ends of the work piece are prepared. Each tool has a plane pressing surface 3, a conical pin 4 surrounded by this pressing surface and a centering cone 5 surrounding the plane surface. The lower tool 2' rests on a support 6 in which the lower ends are securely anchored by two threaded shafts 7, 8 on both sides of the tool. At the upper shaft ends a head plate 9 is attached which carries a hydraulic cylinder 10 at its under side whose ram 11 is connected to a yoke 12 which has corresponding bores for sliding on the threaded shafts 7, 8. The yoke 12 carries the tool 2 for the upper work piece end exactly above the tool 2' for the lower work piece end.

In operation, the yoke 12 is raised and a rough work piece to be turned is inserted into the lower tool 2'. Thereafter the operating fluid is introduced through the conduit 13 into the hydraulic cylinder 10 and the work piece is positioned vertically so that its upper end may be engaged by the centering cone 5 of the upper tool 2 when the yoke 12 is lowered. When the yoke finally abuts against the nuts 14, 15 set on the threaded shafts 7, 8, the work piece 1 is adjusted at both ends to the predetermined axial length established by means of the nuts 14, 15, i.e., provided with plane end surfaces and central countersunk bores for receiving the rotary pin.

According to FIG. 2, the tool 2 consists of an outer part 16 and an inner part 17 guided axially in the outer part which presents the pressing surface 3 and the centering cone 5, while the inner part 17 carries the countersink pin 4 provided with a pointed end. The inner part 17 is connected over a connecting rod 18 with an eccentric wheel 19 of substantial eccentricity and the outer part 16 is connected over a connecting rod 20 to an eccentric wheel 21 of small eccentricity which is connected to a driven eccentric shaft 22. The bearing 23 of the eccentric shaft may be adjusted by means of a threaded spindle 24 in the axial direction of the work piece 1.

In operation the desired work piece length is first set by means of spindle 24. Thereafter the eccentric shaft 22 is driven for a full revolution. Thereby the small eccentric wheel produces over the outer part 16 of the tool 2 the centering and pressing of the end surface of the work piece 1. During the last phase of the pressing procedure only the large eccentric wheel 19 presses the inner part 17 together with the countersink pin 4 into the work piece 1 and produces the central countersunk bore. After a shaft revolution of 180° the work piece is finished and the tool parts 16, 17 are retracted by the eccentric wheels 19, 21 into the starting position.

According to FIG. 3, only inner part 17 of the divided tool 2 is connected to the ram 11 of a hand press. The countersink pin is arranged in the inner part so that it may be readily exchanged. The outer part carries a pressing insert 26 which may also be exchanged readily by means of a locking ring. The pressing unit 26 presents the pressing surface 3 and the centering cone 5. The outer part 16 slides with its rear section on a step 27 of the inner part 17 and rests against the step shoulder 28 over a plate spring 29, a support ring 30 and a coil spring 31. The tension of the coil spring 31 is limited by abutment of the support ring 30 against an additional step shoulder 32 of the inner part 17. The springs 29, 31 are protected by a sleeve 33 secured to the outer part 16.

In operation the tool 2 is advanced first by the press ram 11 against the supported work piece 1, wherein the cone 5 engages the end of the work piece and centers it. During this action the additional coil spring 31 is tensioned until the support ring 30 abuts against the shoulder 32. The further ram movement causes thereafter over the harder plate spring 29 a gradual leveling and pressing of the end surface of the work piece 1. Upon increasing pressure the plate spring 29 is also tensioned and the countersink pin 4 penetrates into the end surface of the work piece 1. Finally the inner part 17 abuts against the insert 26 and the work piece is finished, i.e., it is provided with a smooth end surface and a central countersunk bore for receiving the pin.

According to FIG. 4, the work piece is supported at its periphery, e.g. in fork-shaped holders 34, 34'. A tool 2 or 2' carried by a press ram 11 or 11' bears against each end surface of the work piece. As in the prior embodiment, each tool consists of an inner part 17, 17' carrying a countersink pin 4, 4' and fixed to the ram 11, 11', and of an outer part 16, 16' presenting the pressing surface 3, 3' and the centering cone 5, 5', the outer part being guided for axial sliding movement on the inner part. A coil spring 31, 31' is lodged between a step shoulder 35, 35' of the outer part 16, 16' and a sleeve 36, 36' engaging the press ram 11. 11', and is convered by a sleeve 33, 33' mounted on the outer part 16, 16'.I In operation a work piece 1 is moved by the holders 34, 34', which may be part of a link of a conveyor chain, between the retracted tools 2, 2'. Thereafter the hand presses associated with the rams 11, 11' are actuated uniformly and simultaneously, wherein the tools 2, 2' advance at the same time from opposite sides toward the work piece 1. The work piece is first engaged by the centering cones 5, 5' and centered relative to the tools 2, 2' while the springs 31, 31' are tensioned. Thereafter the countersink pins 4, 4' penetrate into the work piece 1 while the springs are partly under tension, until the outer parts 16, 16' abut with their shoulders 37, 37' against the sleeves 36, 36'. The final ram movement causes then the pressing of the end surfaces to the desired work piece length and the work piece is therefore finished.

In the modified embodiment according to FIG. 5, the locking ring 25, the support ring 30 and the coil spring 31 of the embodiment of FIG. 3 or 4 are missing. Instead only one plate spring 29 is lodged between the inner part 17 and the outer part 16. The cover sleeve 33 is mounted on the inner part 17 and at the forward end of the outer part 16 a shell 38 is fixed which retains the pressing insert 26, presenting the plane pressing surface 3 and the centering cone 5, in the outer part 16. A recessed portion 39 extending over one half of the shell side facilitates the easy insertion of the work piece 1 indicated in broken lines, and by means of setting screws spring loaded steel balls 40 permit a rough clamping of the work piece 1.

According to FIG. 6, the central tool insert 41 presents between its plane surface 3 and its cone pin 4 a transition zone 42 rounded like a collar which produces on the work piece 1 a rounded outer edge around the center hole. Due to this rounded portion the lathe pins are not worn and the unpleasant pitting at the lathe pins is eliminated.

I claim:

1. A pressing tool for preparing work pieces of a tough material on at least one front side for point centering, said tool comprising an outer part presenting a pressing surface and an inner part carrying a countersink pin (4) to press a centering bore into the work piece, said countersink pin presenting a conical point whose tip portion has a steeper cone angle than its base portion to provide point clearance.

2. Apparatus according to claim 1, wherein the outer part (16) carries at its front end a shell (38) recessed over half its side portion and adjustably spring biased steel balls (40) for a rough clamping of the work piece (1).

3. Apparatus according to claim 1, wherein the conical countersink pin (4) merges at its base in the form of a rounded collar (42) into the pressing surface (3) which is normal to the axis.

* * * * *